US010945115B1

(12) United States Patent
Chouraichi et al.

(10) Patent No.: US 10,945,115 B1
(45) Date of Patent: Mar. 9, 2021

(54) CRISIS MANAGEMENT SYSTEM AND METHODS THEREOF

(71) Applicant: West Corporation, Omaha, NE (US)

(72) Inventors: Samah Chouraichi, Omaha, NE (US); Jason Paul Dunphy, Omaha, NE (US)

(73) Assignee: INTRADO CORPORATION, Omaha, NE (US)

( * ) Notice: Subject to any disclaimer, the term of this patent is extended or adjusted under 35 U.S.C. 154(b) by 0 days.

(21) Appl. No.: 16/542,137

(22) Filed: Aug. 15, 2019

(51) Int. Cl.
| | | |
|---|---|---|
| H04W 4/90 | (2018.01) | |
| H04W 12/00 | (2021.01) | |
| H04W 12/08 | (2021.01) | |
| H04W 76/14 | (2018.01) | |
| H04W 4/029 | (2018.01) | |
| H04W 4/024 | (2018.01) | |
| H04W 4/02 | (2018.01) | |
| H04W 4/08 | (2009.01) | |

(52) U.S. Cl.
CPC ............. *H04W 4/90* (2018.02); *H04W 4/024* (2018.02); *H04W 4/027* (2013.01); *H04W 4/029* (2018.02); *H04W 4/08* (2013.01); *H04W 12/00305* (2019.01); *H04W 12/08* (2013.01); *H04W 76/14* (2018.02)

(58) Field of Classification Search
CPC ....... H04W 4/90; H04W 4/023; H04W 4/024; H04W 4/027; H04W 4/029; H04W 4/08; H04W 76/14; H04W 12/08; H04W 12/00305; G08B 25/016
See application file for complete search history.

(56) References Cited

U.S. PATENT DOCUMENTS

| | | | | |
|---|---|---|---|---|
| 2013/0183924 | A1* | 7/2013 | Saigh | A61K 9/0063 455/404.2 |
| 2017/0345285 | A1* | 11/2017 | Merjanian | G08B 27/005 |
| 2019/0035242 | A1* | 1/2019 | Vazirani | G08B 29/188 |
| 2019/0230466 | A1* | 7/2019 | Merjanian | H04W 4/06 |

OTHER PUBLICATIONS

Rave Guardian app flyer, Rave Guardian, 2018, 2 pages. Retreived from https://www.umkc.edu/finadmin/police/documents/Rave_Guardian_Trifold_GENERAL.pdf (Year: 2018).*

* cited by examiner

*Primary Examiner* — Quoc Thai N Vu

(57) ABSTRACT

Disclosed herein are crisis management systems and methods thereof. The crisis management methods may include registering a group of users for access to a crisis management system; receiving, by crisis management system, an indication of a crisis event at a physical location from at least one user of the group of users, the crisis event caused by an aggressor; determining, by crisis management system, a location of the aggressor; creating, by crisis management system, a secure communication channel between the group of users; denying access, by crisis management system, to the secure communication channel to the aggressor; and notifying, by crisis management system, the group of users of the location of the aggressor.

20 Claims, 10 Drawing Sheets

CRISIS MANAGEMENT SYSTEM AND METHODS THEREOF

BACKGROUND

Field of the Invention

This application relates to a crisis management system and methods thereof. More particularly, embodiments of the present disclosure are related to providing secure communication channels during a crisis event, collecting and analyzing crisis data, taking remedial actions, or the like.

Description of the Related Art

A tragic reality in the world today is the increased risk of crisis situations. For example, acts of terrorism aimed at causing mass casualties have been far more common in recent times. There have been numerous tragedies recently where a single aggressor has caused multiple fatalities in crisis situations. Often in these crisis situations, people are trapped by an aggressor often are not aware of what is happening until it is too late. When isolated in these crisis situations (active shooter, bomber, terrorist, or the like), one of the realities people may face is not being able to communicate with others that are also in the crisis situation wherever they happen to be at the start of the event and not knowing what is happening, if help is on the way, the location of the aggressor, or where and how to get to the safest place. The lack of communication between people in these situations may lead to the loss of lives that may be potentially saved if the people had better readily available information.

Some possible solutions to address providing information in a crisis situation have included mobile apps designed to help users report their status during a school shooting situation to law enforcement. These apps only report the location and existence of a shooting and require an initial mapping of a school. Other possible solutions include a mobile panic button that allows users to call an emergency telephone number. These solutions are not sufficient, however because they do not notify users what is happening, if help is on the way, the location of the aggressor, or where and how to get to the safest place. Thus, there is a need for an improved crisis management system and methods thereof.

SUMMARY

Example embodiments of the present application provide at least a crisis management system and methods thereof. According to an exemplary embodiment of the present invention, there is provided a method comprising registering a group of users for access to a crisis management system; receiving, by crisis management system, an indication of a crisis event at a physical location from at least one user of the group of users, the crisis event caused by an aggressor; determining, by crisis management system, a location of the aggressor; creating, by crisis management system, a secure communication channel between the group of users; denying access, by crisis management system, to the secure communication channel to the aggressor; and notifying, by crisis management system, the group of users of the location of the aggressor.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
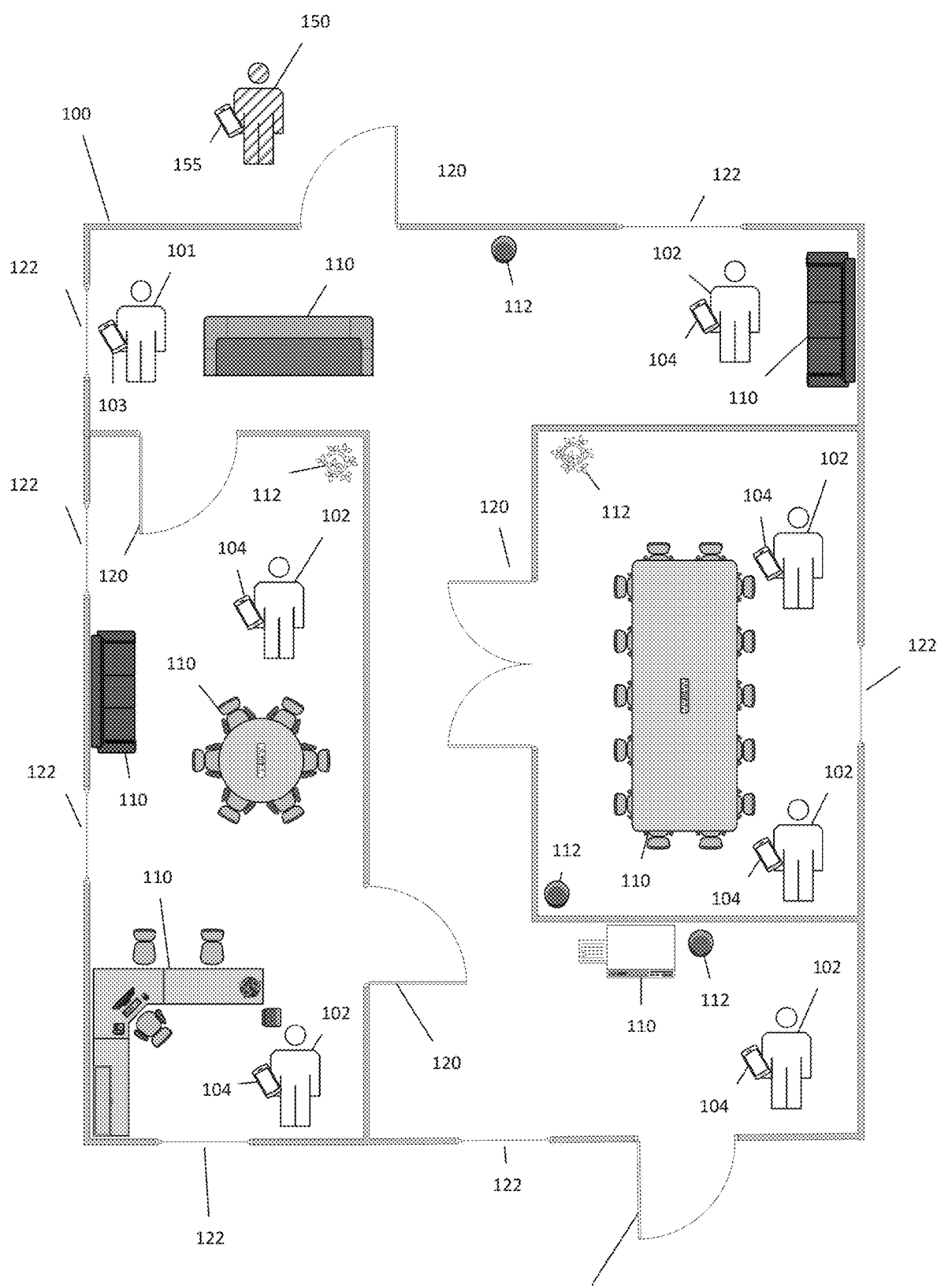
FIG. 1 is a schematic, pictorial representation of a potential crisis event occurring in a structure according to an illustrative embodiment.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

This application relates to a crisis management system and methods thereof. More particularly, embodiments of the present disclosure are related to analyzing collected data, taking remedial actions, and providing various modes of communication during a crisis event, or the like.

Embodiments of the present disclosure may include a system that may include a mobile app that can connect people safely during a crisis situation in order to share and obtain vital, real-time updates on the active event. The systems and methods disclosed herein may crowdsource critical information on the aggressor(s) and streamline the data reporting and analytics to law enforcement to help resolve the crisis situation faster. Functionalities of the system may include providing notifications to users of an event, authenticating users, providing helpful tips or information, and providing a safe communication space free of the aggressor(s).

It will be readily understood that the components of the present application, as generally described and illustrated in the figures herein, may be arranged and designed in a wide variety of different configurations. Thus, the following detailed description of the embodiments as represented in the attached figures, is not intended to limit the scope of the application as claimed but is merely representative of selected embodiments of the application. Advantages and features of the present disclosure and technologies accomplishing them will become apparent from exemplary embodiments described in detail below with reference to the accompanying drawings.

The features, structures, or characteristics of the application described throughout this specification may be combined in any suitable manner in one or more embodiments. For example, the usage of the phrases "example embodiments", "some embodiments", "exemplary embodiments," or other similar language, throughout this specification refers to the fact that a particular feature, structure, or characteristic described in connection with the embodiment may be included in at least one embodiment of the present application. Thus, appearances of these phrases throughout this specification do not necessarily all refer to the same group of embodiments, and the described features, structures, or characteristics may be combined in any suitable manner in one or more embodiments.

For the purpose of simplification and clarity of illustration, a general configuration scheme will be illustrated in the accompanying drawings, and a detailed description for the feature and the technology well-known in the art will be omitted in order to prevent the discussion from being unnecessarily obscure. Additionally, components in the accompanying drawings are not necessarily drawn to scale. For example, sizes of some of the components illustrated in the accompanying drawings may be exaggerated as compared with other components in order to assist in the understanding of exemplary embodiments of the present invention. Like reference numerals on different drawings will denote like components, and similar reference numerals on different drawings will denote similar components but are not necessarily limited thereto.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

In some embodiments, a crisis management system may be provided for managing a crisis situation at a location. A crisis management system may allow users to register, for example, in groups. It is not uncommon for an aggressor in a crisis situation (a bomber, a terrorist, a shooter, or the like) to be a member of the group he or she is attacking. For example, a disgruntled employee may become an aggressor and create a crisis situation at their current or former place of employment. If the users are all registered in a group (for example, employees of a company or those that work in a building) and the aggressor is a member of the group, the aggressor may be more easily identified by the system by using their registration in the system, or the like. In some embodiments, when the aggressor is identified, their access to the crisis management system and all communications in the crisis management system may be terminated or otherwise prevented.

When a crisis event starts, for example, an aggressor makes threats or begins shooting, a user of the crisis management system, or the system itself, may alert the other non-aggressor users that a crisis has started. The crisis management system may be configured to receive an indication and begin the process of identifying the aggressor using all information received and available to the system and tracking the location of the aggressor. The system may be configured to create a secure communication channel between the group of users, which may include known method of secure communications, such as encrypted data, or the like. The system may also deny, terminate, or the like, access to the secure communication channel to the aggressor. The system may also notify the group of users of the location of the aggressor. If the aggressor is carrying a device associated with the identity of the aggressor such as a personal mobile phone, or an identification tag, or the like, the system may automatically identify the aggressor and notify the group members.

The system may identify the safest or fastest path of escape, if it is advisable to try and escape the location of the crisis. For example, the system may identify what hallways or stairwells the users should attempt to use to escape the crisis. The system may take into account possible obstacles or obstructions to escape, such as furniture, or the like. The escape route may be determined in part based on the user's physical capabilities. For example, the users may be tested or input their foot speed and/or any physical limitations that may inhibit escape.

The users may generally communicate with mobile communications devices, but other suitable methods of communication, such as desktop computers, or the like, are contemplated by and within the present disclosure. In some embodiments, the system may notify law enforcement of crisis information. The information may include the identity of the aggressor, the location of the aggressor, the locations of each user of the group of users, and all data related to the crisis collected by the system (audio recordings, video recordings, real-time video, real-time audio, or the like).

In some embodiments, a crisis suppression system may activate a door lock, an audible alarm, a vision suppression system, a hearing suppression system, and an alert transmission system to deter, slow down, stop, or the like the aggressor. For example, a smoke system may decrease visibility of the premises and make it more difficult for the aggressor to see any people in the facility. An audible alarm may startle the aggressor and make it more difficult to hear others trying to escape, or the like. Physical locks, doors, cages, or barriers may be deployed to stop the progress of the aggressor, or the like.

FIG. 1 is a schematic, pictorial representation of a potential crisis event occurring in a structure 100 according to an illustrative embodiment. In this illustrative embodiment, an aggressor 150 is approaching the structure 100 with the intent of causing casualties. The users 101, 102 are unaware of the aggressor's 150 presence. When the aggressor 150 enters the structure 100, the system may be activated by an initial user 101 or any other user 102. When the system is activated, processes are initiated to create a secure line of communication between a group, e.g., occupants of the structure 100. A process for identifying the aggressor 150, cutting off the aggressor's 150 access to the system via their mobile device 155, or the like, may also be initiated. The system may also analyze information received from the users 101, 102 and provide information that may help reduce potential casualties in the crisis situation. Examples of this information may include the location of the aggressor 150, the identity of the aggressor 150, potential escape routes through doors 120, windows 122, or the like, potential objects 110 (furniture, equipment, etc.) that may provide cover, objects 112 the users may use as a weapon in defense to stun or injure the aggressor, or the like. The users 101, 102 may use a communication device 103, 104 to relay all information to the system for distribution to all users 101, 102. The system may also provide individualized plans and/or information to each user 101, 102 for escaping the crisis or protecting themselves. When activated, the system may analyze all available data and provide a recommended course of action to each user 101, 102. For example, each user 101, 102 may be provided with instructions to shelter in place behind furniture 110, flee the structure 100 through a window 122, door 120, or any other egress.

The system may also use all available information to identify the aggressor 150, their location, a predicted path, the time it would take them to reach each user 101, 102, or the like. The system may also provide a secure line of communication between each user 101, 102, for example, using a mobile device 103, 104, computing device, stand-alone terminal, alert system, or the like. Once the identity of the aggressor 150 is determined by the system, that user may be cut off from communication with the other users 101, 102. For example, if the aggressor 150 is an employee of a business operating in the structure 100, that user's access to the communication system may be denied, thereby preventing the aggressor 150 from viewing the communications of the other users 101, 102 via their mobile device 155. The system may also take various remedial actions, such as locking doors 120 or windows 122, to potentially prevent the aggressor 150 from reaching users 101, 102. The system may also activate an alarm system, notify law enforcement, notify others in the vicinity to the structure 100, notify all users 101, 102, notify all users that have signed up for the system, or take a physical remedial action. Physical remedial actions may include locking entry ways, activating vision reducing devices, such as devices capable of creating a fog or smoke to decrease the aggressor's 150 visibility and potentially reduce casualties. Other remedial actions may be to activate a security robot programmed to engage the aggressor 150 or any weapon system programmed to neutralize the aggressor 150. Another action that may be initiated by the system is deployment of healthcare assistance, such as ambulance and medical professionals, to the crisis. The system may also be configured to analyze all available healthcare options, including using objects available to the user (e.g., instructions to use a belt as a tourniquet) to treat victims of the crisis event.

Embodiments of the present disclosure may include a system including a mobile app that can connect people safely during a crisis situation in order to share and obtain vital, real-time updates on the active event. The app may crowdsource critical information on the aggressor(s) and streamline the data reporting and analytics to law enforcement to help resolve the crisis situation faster. Functionalities of the system may include providing notifications to users of an event, authenticating users, providing helpful tips or information, and providing a safe communication space free of the aggressor(s).

Figure 2:
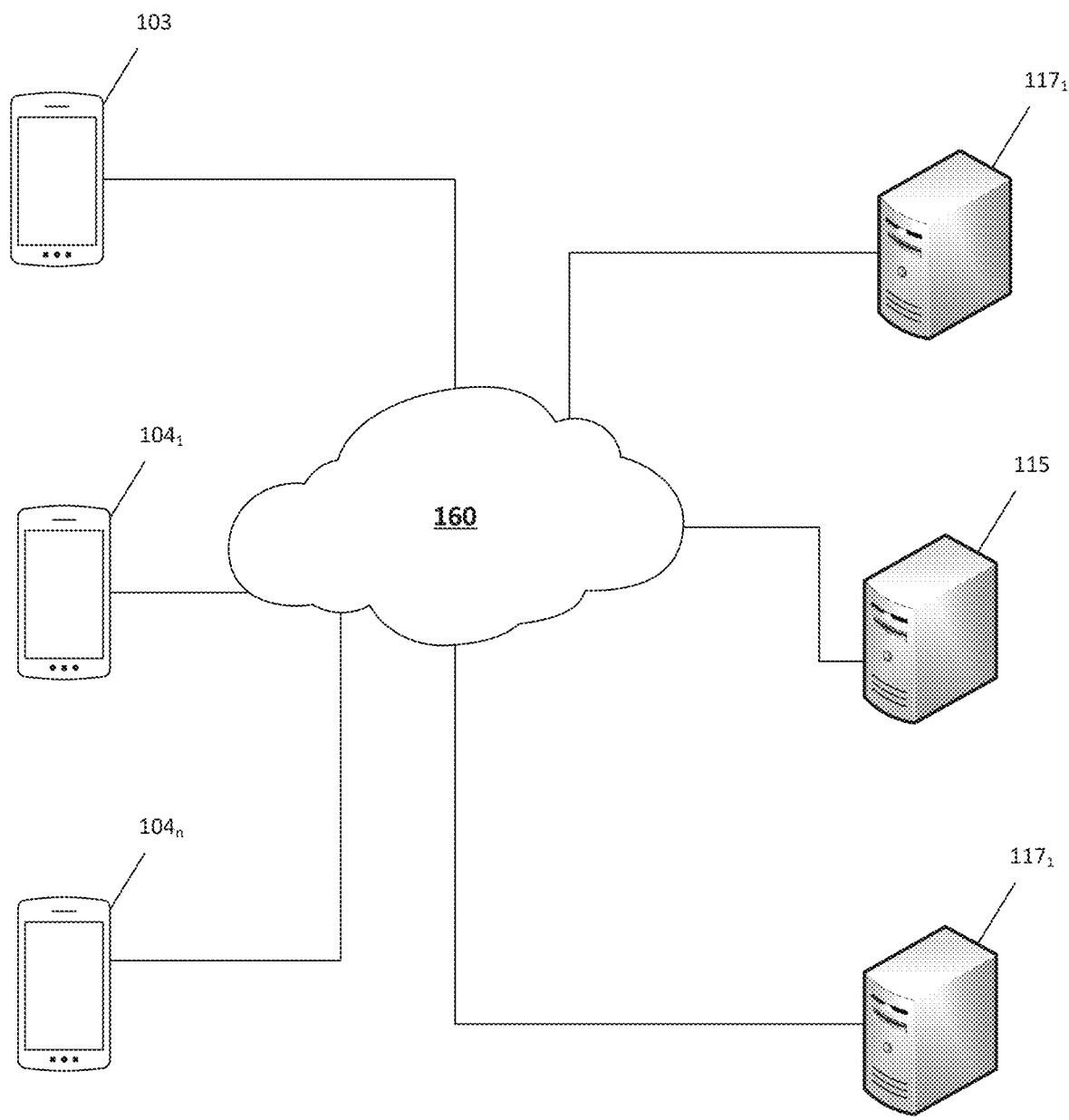
FIG. 2 is a system-level network diagram of a portion of a crisis management system according to an illustrative embodiment.

FIG. 2 depicts a system-level network diagram of a system for crisis management in accordance with one embodiment of the present disclosure. The system generally comprises at least a first user device 103 and secondary user devices 1041 and 1042, each in communication with an administrator, generally hosting a central server 115, through a network 160. Methods in accordance with one or more embodiments of the present invention take place over the network 160, which may comprise a global computer network, for example, the Internet.

Although FIG. 2 explicitly depicts two secondary users, it should be appreciated that N represents any number of users feasible in accordance with embodiments of the present invention. For ease of reference, as used herein, each of the terms "second user" or "secondary user" may refer to any one or all user devices 1041 and $104_N$ within the system. Likewise, although FIG. 2 explicitly depicts only one first user device 103, there may be more than one first user device 103 in accordance with certain embodiments of the present invention. That is, in certain embodiments, multiple users may perform the same or similar functions as the first user device 103. As understood by embodiments of the present invention, a user may include any person, business or entity, capable of participating in the system and methods disclosed herein.

The first user device 103 may generally be used by an entity or person that is in proximity to the start of a crisis situation. An exemplary first user device 103 may comprise a mobile communications device used by an individual in a crisis situation, the user being the first to provide information about a crisis, or the like. The secondary user devices 104 may generally be used by additional users at risk and in proximity to the first user device 103. In many embodiments, the secondary user devices 104 may be used by people in the same structure as the first user device 103. In a basic exemplary embodiment, within the system 100, the first user device 103, and/or any of the secondary user devices 104, may be capable of transmitting data to and from an administrator. The user devices 103, 104 in the context of the present application may include, but is not limited to, a mobile communications device, a personal computer, a portable computer, a handheld computer, a kiosk station, a terminal station, a cellular phone, a smartphone, a digital tablet, a laptop computer, an Internet appliance, or the like.

The administrator generally utilizes a server 115, which may be physically present in the structure of a crisis situation and may host an accessible data portal to the system. In some embodiments, the server 115 may be located on a third-party location (e.g., a server farm, or cloud), or at a location of the first user device 103, or any one or more of the secondary user devices 104. The accessible data portal, which may be accessible to the first user device 103 and any of the secondary user devices 104, may provide a secure line of communication between user devices 103, 104 via the network 160. The data portal may comprise any number of security measures to provide a secure system, suitable for embodiments of the present invention. The data portal may further comprise a graphical user interface (GUI) through which any of the first user device 103 or secondary user devices 104 may access the system.

Methods in accordance with embodiments of the present invention may take place over the network 160, which may comprise a global computer network, for example, the Internet. The communications functions described herein can be accomplished using any kind of wired and/or wireless computing network or communications means capable of transmitting data or signals, such as a wireless and/or wired computing network allowing communication via, for example, an 1002.11 ("Wi-Fi") protocol, cellular data protocol (e.g., EDGE, CDMA, TDMA, GSM, LTE), and/or the like. Suitable examples include a packet-switched network, a local area network (LAN), wide area network (WAN), virtual private network (VPN), or any other means of transferring data. The network 160 may be a partial or full deployment of most any communication/computer network or link, including any of, any multiple of, any combination of or any combination of multiples of a public or private, terrestrial wireless or satellite, and wireline networks or links. A single network 160 or multiple networks that are communicatively coupled to one another can be used. It is contemplated that multiple networks of varying types can be connected together and utilized to facilitate the communications contemplated by the systems and elements described in this disclosure.

The system may also comprise secondary servers $117_1$ and $117_n$. Although two secondary servers $117_1$ and $117_n$ are depicted in FIG. 1, it should be appreciated that "n" represents any number of servers feasible in accordance with embodiments of the present disclosure. For ease of reference, as used herein, the term "server" may refer to any one or all of the servers, 115, $117_1$, and $117_n$ within the system. That is, in certain embodiments, multiple servers may perform the same or similar functions.

The server 115, 117 may also comprise a database or other sortable data storage memory to enable the system and methods disclosed herein. In many embodiments, the database may be any commercially available data storage database suitable for embodiments of the present disclosure. For example, in one embodiment, the database comprises at least one or more database management systems, such as any of an Oracle, DB2, Microsoft Access, Microsoft SQL Server, Postgres, MySQL, 4th Dimension, FileMaker, Alpha Five Database Management System, or the like. Often contained within the database is a plurality of data sets, each comprising specific data. A first data set may correlate to a first user device 103, wherein a plurality of user-specific data is stored. The database may also include any number of subsequent data sets representing N servers, wherein N represents any number of servers practical for operation of embodiments of the present disclosure.

Figure 3:
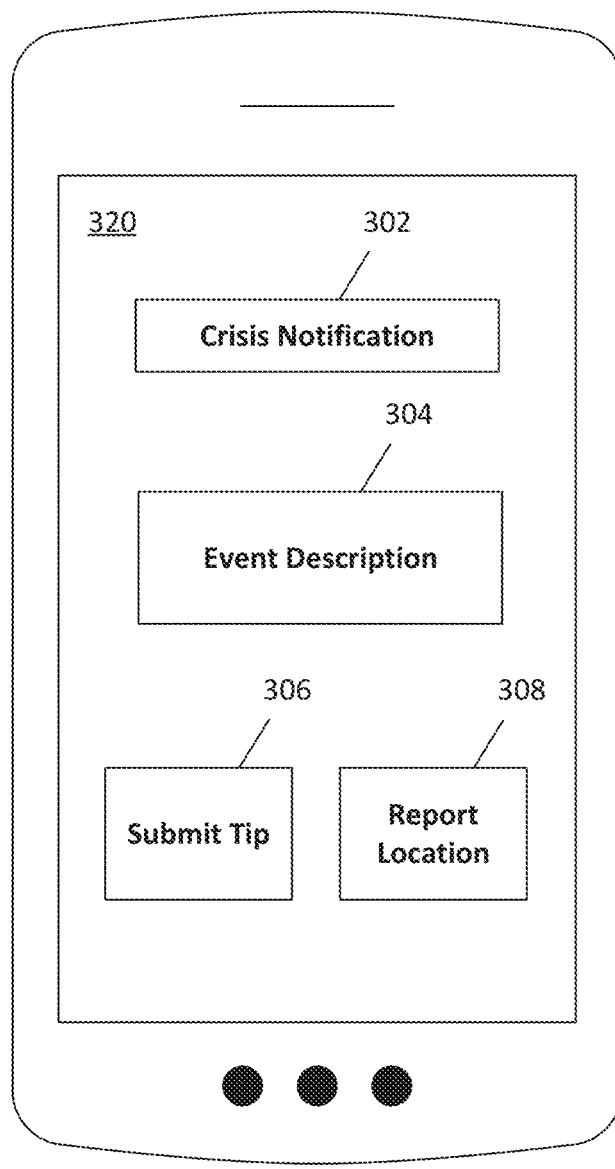
FIG. 3 is a schematic, pictorial representation of a crisis management system user interface according to an illustrative embodiment.

FIG. 3 is a schematic, pictorial representation of a crisis management system user interface according to an illustrative embodiment. The user interface may be referred to as a graphical user interface ("GUI") herein. FIG. 3. depicts a block diagram of a GUI 320 displayed on a display of a mobile device 104 in accordance with embodiments of the present disclosure. The GUI 320 may generally be adapted to provide the user with a portal to access any system in accordance with the present disclosure, activate remedial measures, and view information generated by the system on the display of a user device, or the like. For example, the display 130 may comprise two dimensional display, a three dimensional display, a touch screen display, a display that provides haptic feedback, a four dimensional display, a plasma display, a liquid crystal display, or the like. The user device 103 may comprise any entity in accordance with embodiments of the present disclosure.

The GUI 320 may be adapted to display queries to the user in connection with the user registration process, to allow an entity to interact with the system. For example, the GUI 320 may display queries, action instructions, or any inquiry in accordance with the present disclosure, or the like. The GUI 320 may be also adapted to enable an entity to submit data, receive data from an entity, and send data to other entities or user accounts through use of the system. The GUI 320 may be adapted to be user friendly, and to comprise customizable menus to allow the user to manipulate the look and feel of the display of data and images generated by the system 400. In addition, the GUI 320 may be adapted to allow a user to receive informational updates and/or interact with other users through direct messages, text chats, video chats, instant messaging, user generated feeds, secure messages, or the like. The GUI 320 may also be adapted to display options for sending or receiving a crisis notification 302, describing at least a portion of an event through an event description 304 option, submitting a tip 306, reporting a location of an aggressor or a user through a report location option 308, or the like.

Figure 4:
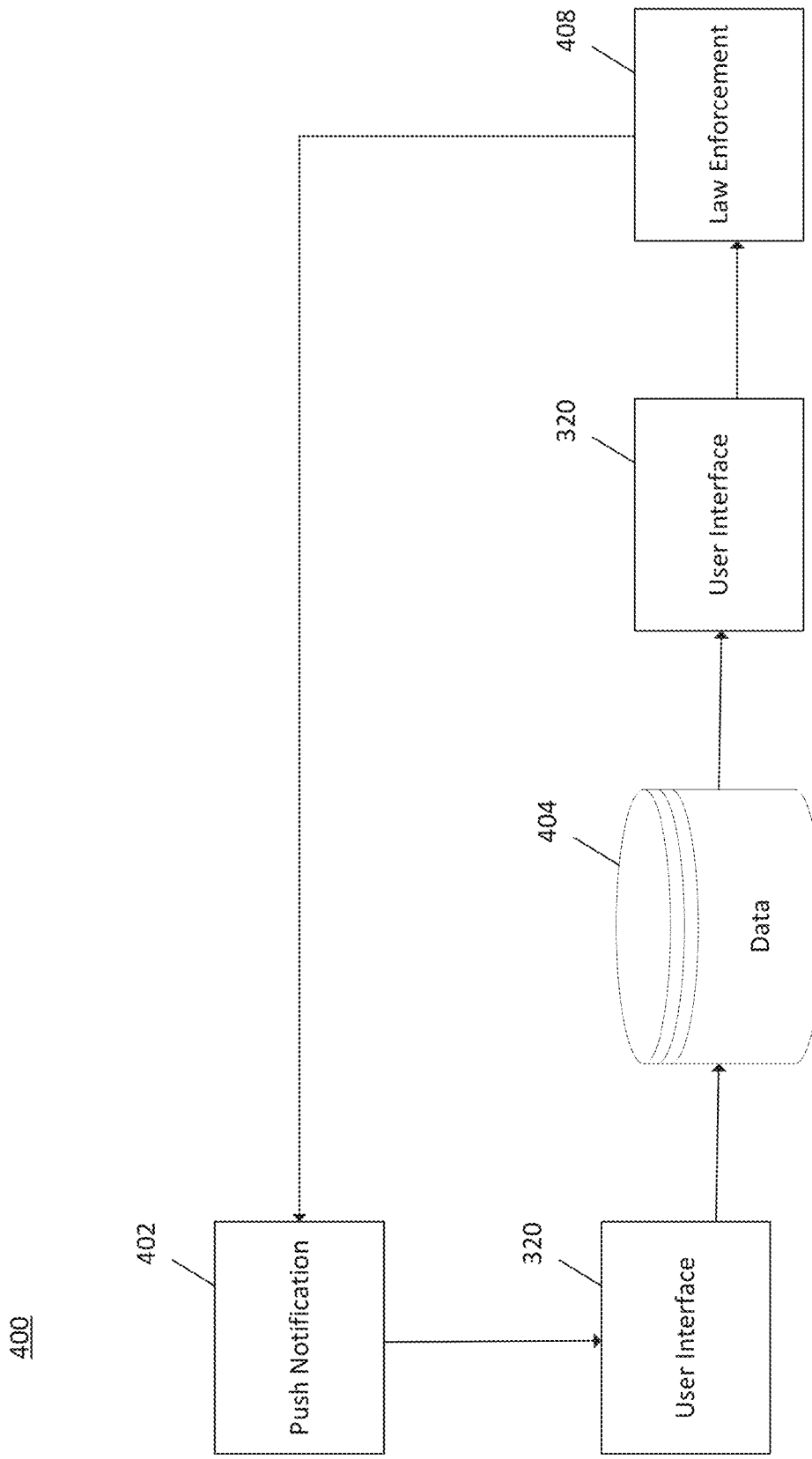
FIG. 4 is a system-level network diagram depicting functionalities of a crisis management system according to an illustrative embodiment.

FIG. 4 is a system-level network diagram of functionalities of a crisis management system according to an illustrative embodiment. A push notification 402 may enable a user to send or receive push notifications providing updates, instructions, confirmations, or the like during a crisis event. For example, a push notification 402 may indicate the location of a crisis event beginning, the identification of an aggressor, the location of the aggressor, the movement of the aggressor, the location of law enforcement, instructions on a path to safety, any notification in accordance with the present disclosure, or the like. This data may be presented on a user interface, such as the GUI 320 described herein. The user interface 320 may allow a user to send and receive data about the crisis event, which may be stored in a database 404, or the like. Data submitted by one user and stored in the database 404 may be accessed by an additional user via a user interface 320. The user interface 320 may allow the user to interact with law enforcement 408 via a communication channel, as disclosed herein. The user interface 320 may allow the user to provide information to law enforcement 408 and/or receive information form law enforcement 408, such as push notifications 402, or the like.

Figure 5:
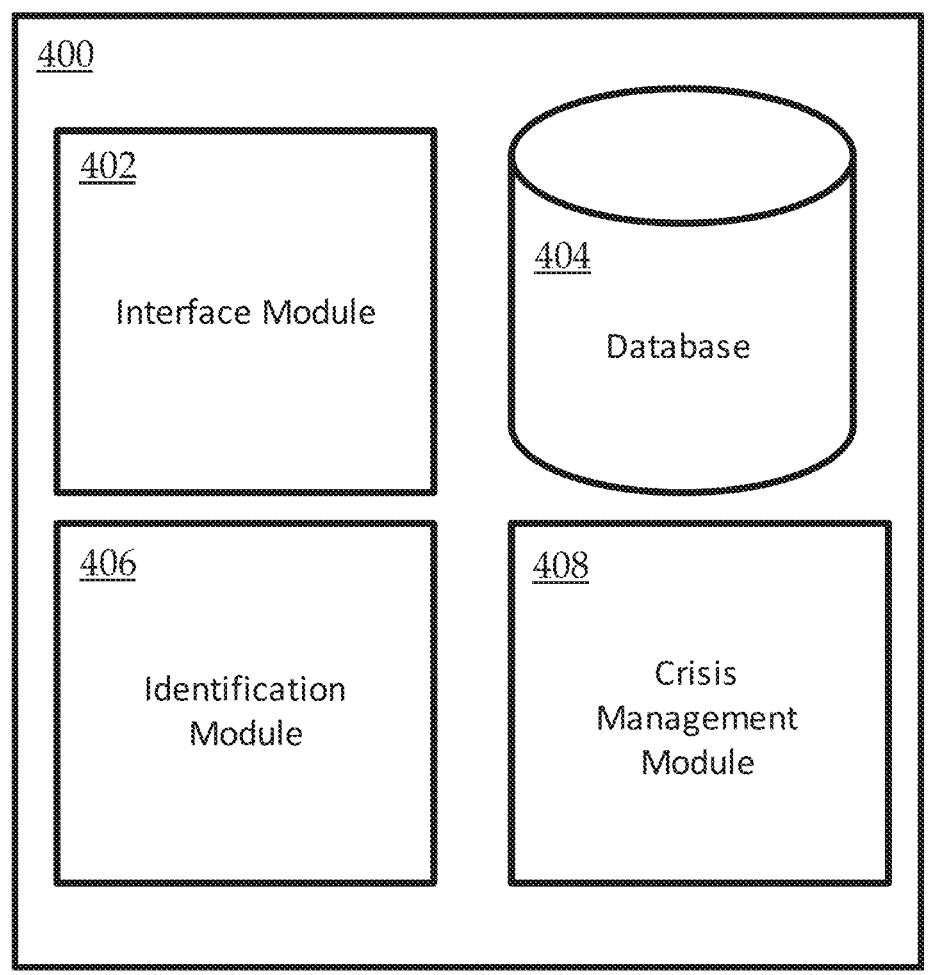
FIG. 5 is a system-level network diagram of modules of a crisis management system according to an illustrative embodiment.

Referring now to FIG. 5, a block diagram of an example system 400 in accordance with embodiments of the present disclosure is illustrated. The system 400 may generally comprise computer executable software and/or instructions configured to, when executed, cause a processor or the like to perform the functionality of the systems and methods disclosed herein. The system 400 may comprise an interface or graphical user interface ("GUI") module 402, an entity database 404, an identification module 406, a crisis management module 408, or the like. In exemplary embodiments, the system 400 may comprise a system of managing crisis management in accordance with embodiments of the present disclosure. The system 400 may be adapted to encourage entities within the system 400 to provide information useful to the safety of the users.

The Interface module 402 may be adapted to generate a graphical representation of the data received, stored, and/or manipulated by the system 400, such that elements of the system 400 may be displayed on a communications device, or the like. In exemplary embodiments, a GUI may be adapted to display a graphical representation of the layout of a structure where a crisis is occurring, the location of an aggressor, or the like. The GUI may also be adapted to enable a user to enter data, control functionality of the system 400, and manipulate the system 400 and data stored within the system 400. The GUI may comprise a look and feel that is comfortable for the user and user-friendly. The appearance and functionality of the GUI may generally be configured by an administrator or may be preconfigured. An example of a GUI may be seen with respect to FIG. 3, described above.

In order to access the system 400, in some embodiments, the interface module 402 may only be accessible by certain users, while other users (e.g., the aggressor) may be denied access. During user setup, the system 400 may require an entity to pass a security check to insure identity of the entity to access the system. In many embodiments, such security may be confirmed via the manual entry of certain security data, such as personal data, or biometric security data (fingerprint, retinal scan, etc.), entry of a password mailed to an entity, or the like. The interface module 402 may create groups of users (e.g., employees working in a structure or students attending a university) that can be identified. User profiles may be created for each user of the system, and if one of the users of the system is identified as an aggressor and verified by the system, the aggressor's access to the system, including communications with other users, may be denied.

The interface module 402 may be adapted to receive the registration of an entity for a user account or a system account. System accounts may be granted access to the system 400 and may comprise different types of accounts. For example, a system account may be adapted for use by specific types of entities. An entity may comprise an individual, an employee, a law enforcement professional, a business, an institution, or any user granted access to the system 400. In addition to type of entity, different system accounts with different capabilities and/or security permissions may be created by the interface module 402 in response to information received from an entity. The interface module 402 may generally be adapted to allow an entity to register for an account by providing information regarding the nature of the entity and/or specific information about the entity. For example, the system 400 may be adapted to allow an entity to select a type of account based upon whether the entity is an employee, a student, a law enforcement professional, a medical professional, or the like.

The interface module 402 may also be adapted to generate System accounts with different capabilities within the same entity type. For example, an entity may comprise different individual users with different roles and responsibilities, such as administrators, security personnel, law enforcement, medical professionals, security team leaders, and/or the like. The interface module 402 may also be adapted to receive questions and generate answers to the questions. The interface module 402 may be adapted to provide a secure channel of communication between users and deny access to these communications to the aggressor. The interface module 402 may also be configured to store data related to the entities, whether provided by an entity or generated by the system 400, in an entity database 404 or other sortable data storage memory adapted to enable the systems and methods disclosed herein.

The entity database 404 may be any data storage database suitable for embodiments of the present disclosure. For example, in one embodiment, the entity database 404 may comprise at least one or more database management systems, such as any of an Oracle, DB2, Microsoft Access, Microsoft SQL Server, Postgres, MySQL, 4th Dimension, FileMaker, Alpha Five Database Management System, or the like. Data stored in the entity database 404 may generally be accessed by any module described herein. In some embodiments, each module may be configured with specific security permissions, for example, read, write, execute, delete, and/or the like.

The entity database 404 may be adapted to store data received by all other modules, including identification module 406. The identification module 406 may be adapted to receive information about the aggressor and perform analytics on the received information to identify the aggressor and/or their location. For example, the identification module 406 may use camera data from users, security cameras, text data, voice analysis data, and/or the like received via the system 400 from the users of the system 400 and/or any device communicatively coupled with the system.

The identification module 406 may also be adapted to receive more detailed information regarding the aggressor. For example, detailed information may include the aggressor's personal make-up (e.g., gender, age, height, weight, eye color, hair color, languages, area where residing, race, education level or the like), clothing, weapons, and/or the like. The system may present follow-up inquiries based on answers to information provided by the users.

The crisis management module 408 may be adapted to enable remedial actions, such as those discussed supra. The crisis management module 408 may be configured to analyze all available data and present the users with instructions for the safest course of action. The crisis management module 408 may also be adapted to enable remedial actions, such as actions intended to disorient, distract, or otherwise deter the aggressor and deploy first responders to the crisis location.

Figure 6:
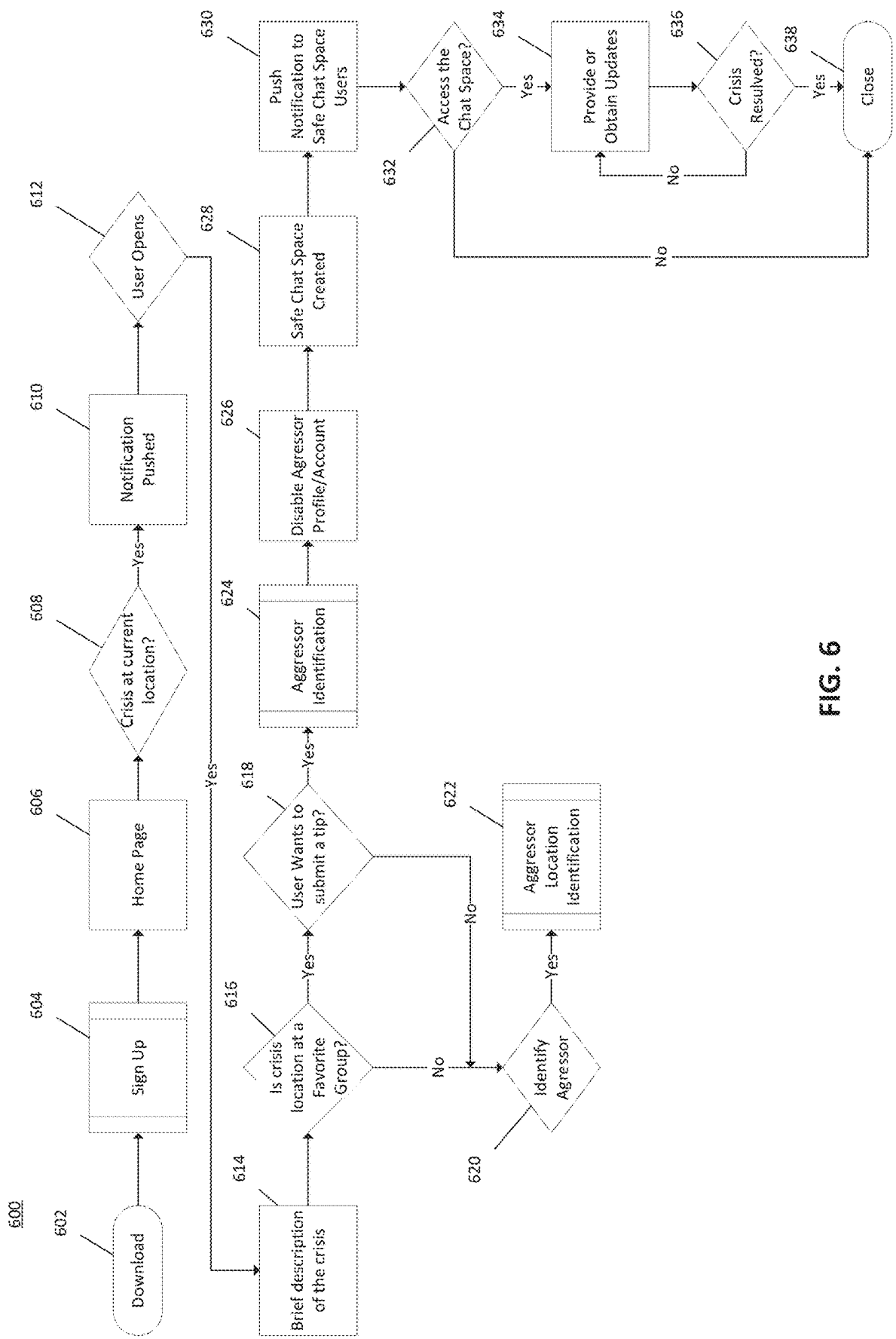
FIG. 6 is a flow chart illustrating a portion of a crisis management system in accordance with an illustrative embodiment.

Referring now to FIG. 6, a flow chart illustrating a portion of a crisis management system in accordance with an illustrative embodiment is depicted. An example method 600 for crisis management is shown. The method 600 begins at step 602, where a portion of the system is downloaded or otherwise obtained by the users. In some embodiments, the system may be configured to operate within the "cloud," and a physical download of the system may not be required. In step 604 the user is presented an option to sign up. During sign-up, the system collects all relevant information about the users that may be useful in managing a crisis event.

At step 604, the user may sign up for or be placed into a "Favorite Group." The Favorite Group may be a grouping of individual users that share characteristics. For example, a Favorite Group may comprise students of a class, students of an educational institution, members of a sports team, employees of a company, employees working in a particular floor of a building or in the entire building, members of a church congregation, members who are attending a performance, and/or the like. At step 606, the user is presented with a "home page" or the like that allows the user to manage their information and, during a potential crisis, interact with the system. For example, the user may be presented with the option to notify law enforcement, securely communicate with other users, activate remedial actions, receive safety instructions, provide relevant information, and/or the like. A Favorite Group can also be the location of a group of individuals, such as a building, a congregation area, a temporary structure, or the like. A Favorite Group may also be automatically determined by the system based on the same or similar location and/or characteristics of users.

At step 608, it is determined whether there is a crisis at the current location of the user. If the system is notified that there is currently a potential or actual crisis, the method advances to step 610, where a notification is pushed. A notification may be pushed to the mobile communications devices of the users, law enforcement, medical professionals, people in the area, residents of the town, and/or the like. A notification may be pushed via a pop-up screen, a physical notification (such as a vibration or alarm sound), via a mobile communication device, or the like. At step 612, the user may open or otherwise access the push notification and be presented with the option of providing a description of the crisis (shooter, bomber, terrorist, or the like). At step 616, when the system is notified or determines that a crisis event is occurring, the system begins to analyze the data and determines whether the crisis location is at a Favorite Group. If the crisis location is at a Favorite Group, the system presents the user with an opportunity to submit a tip for submission to other users regarding the crisis, such as safe hiding spaces, methods of egress, or the like.

The system may also present the user with the option of entering identifying data about the aggressor at step 620. At step 620, the aggressor information is received and the location of the aggressor may be determined at step 622. If the user wishes not to or is unable to submit a tip at step 618, the method advances to step 624 where the system analyses available data and may identify the aggressor. When the aggressor is identified at step 624, remedial actions may be initiated. In this example, the aggressor 626 may have a user profile or account to the system, which may be disabled by the system. At step 628, a safe chat space or other communication channel may be established between users of the system that are not identified as aggressors. In some embodiments, the chat space or communication channel may be established and if any user is subsequently identified as an aggressor, their account may be disabled. The system may verify the identification of an aggressor, for example, using camera feeds, or the like.

At step 630, a push notification may be issued to users of the system, notifying them that a crisis event is occurring and all relevant information available, such as the identity and location of the aggressor, whether law enforcement has been notified and/or is on the way, whether healthcare professionals or other first responders have been notified, potential areas for hiding or egress, and/or the like. At step 632, all users who are not identified as aggressors may be provided with the option to access the chat space or communication channel. If the users do access the chat space or communications channel, they may provide updates at step 634. The updates may be communicated to users, law enforcement, or the like. The users or law enforcement may indicate whether the crisis has been resolved at step 636. If the crisis has not been resolved, the method may return to step 634, where additional updates may be provided or obtained. If the users or law enforcement indicate the crisis has been resolved, the method may end at step 638, where the system is closed. If the users chose not to access the chat space or communications channel at step 632, the method may proceed to step 638 where the method ends and the system is closed.

Figure 7:
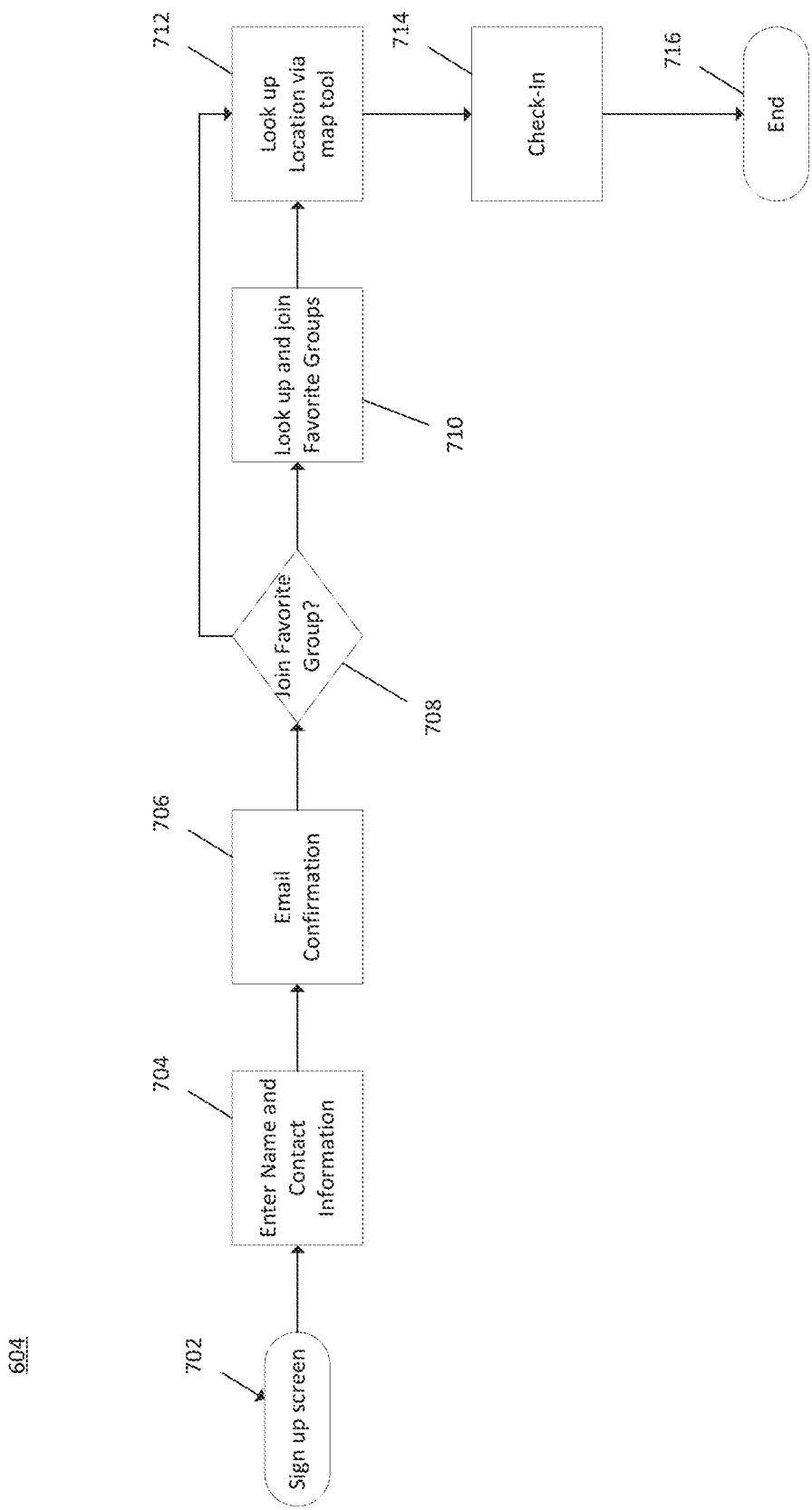
FIG. 7 is a flow chart illustrating a portion of a crisis management system in accordance with an illustrative embodiment.

Referring now to FIG. 7 a flow chart illustrating a portion of a crisis management system in accordance with an illustrative embodiment is depicted. In accordance with some embodiments, a method of signing up 604 may begin at step 702 where sign up screen is initiated. The user may enter their name and contact information at step 704. At step 706, the user, an administrator, and/or the like may receive an email or other type of confirmation. At step 708, the user is presented with an option to join a Favorite Group (discussed Supra). At step 710, if the user decides to join a Favorite Group, the system will allow the user to look up and join the Favorite Group at step 710. At step 712, the system may look up the users location. For example, the system may use the location of the Favorite Group or identify the user's location with another device, such as a GPS device, or the like. At step 714, the system may allow the user to check-in and indicate that they are present at a location, or the system may automatically check the user in and indicate they are present in a location by using location data. The initial set up method 604 may end at step 716.

Figure 8:
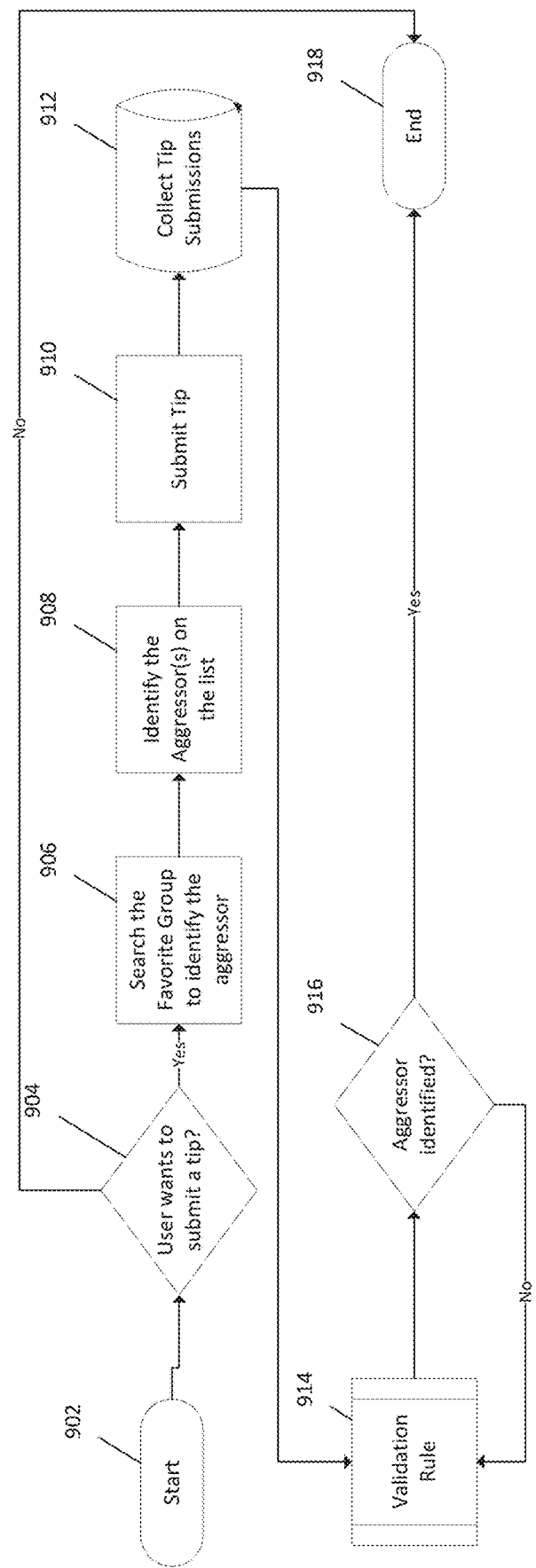
FIG. 8 is a flow chart illustrating a portion of a crisis management system in accordance with an illustrative embodiment.

Referring now to FIG. 8, a flow chart illustrating a portion of a crisis management system in accordance with an illustrative embodiment is depicted. A method of submitting a tip may start a step 902. At step 904, the system determines or provides an opportunity for the user to indicate whether they wish to submit a tip. If the user wishes to submit a tip, the method advances to step 906, where the Favorite Group is searched to identify the aggressor. If the user does not wish to submit a tip at step 904, the method ends at step 918. When the Favorite Group is searched at step 906, the aggressor(s) on the list may be identified at step 908. At step 910 the user may be presented with the opportunity to submit a tip. At step 912, data regarding tip submissions may be collected and stored in a database. At step 914, the data may be validated using rules of the system. At step 916, if the aggressor is identified, the method advances and ends at step 918. If the aggressor is not identified, the system again uses validation rules 914 until the aggressor is successfully identified at step 916 and the method ends at step 918.

Figure 9:
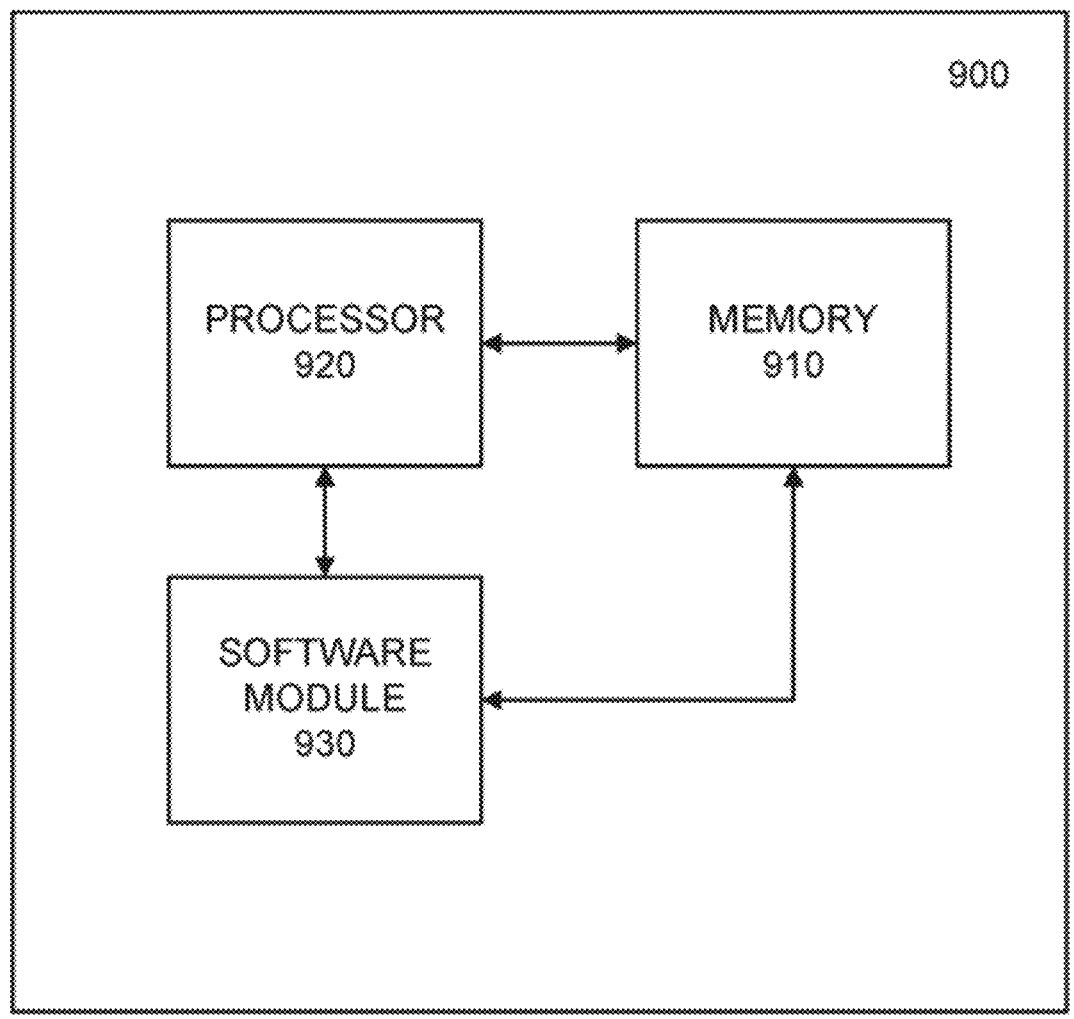
FIG. 9 illustrates an example network entity device configured to store instructions, software, and corresponding hardware for executing the same, according to example embodiments of the present application.

FIG. 9 illustrates an example network element 900, which may represent any of the above-described network components of the other figures. As illustrated in FIG. 9, a memory 910 and a processor 920 may be discrete components of the network entity 900 that are used to execute an application or set of operations. The application may be coded in software in a computer language understood by the processor 920, and stored in a computer readable medium, such as, the memory 910. The computer readable medium may be a non-transitory computer readable medium that includes tangible hardware components in addition to software stored in memory. Furthermore, a software module 930 may be another discrete entity that is part of the network entity 900, and which contains software instructions that may be executed by the processor 920. In addition to the above noted components of the network entity 900, the network entity 900 may also have a transmitter and receiver pair configured to receive and transmit communication signals.

Additional example embodiments provide multimode configuration options for customers using user devices (i.e., user devices, mobile devices, smartphones, other computing devices, etc.), to access multi-mode and/or multi-platform service platforms. For example, a visual and/or customized voice platform may provide interactive voice response menu options and other modes of operation (e.g., SMS, email, third-party device options, chat, etc.) to process user interaction data for purposes of offering services which may enable concluding a call or other active communication session.

Figure 10:
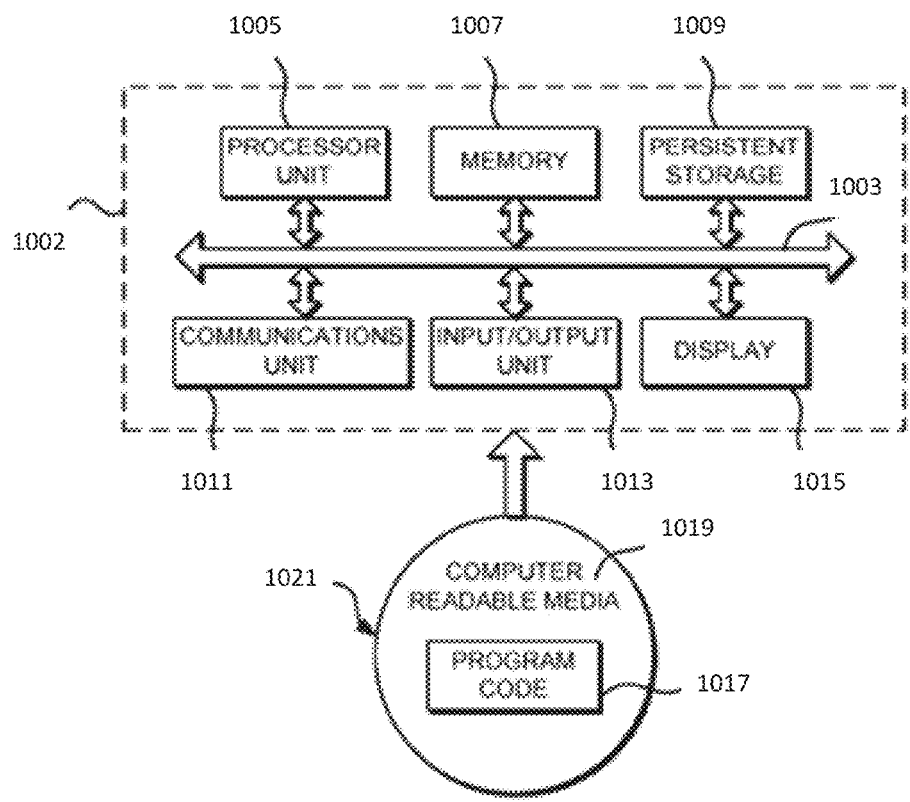
FIG. 10 is a block diagram of a computing device in which illustrative embodiments may be implemented.

Referring to FIG. 10, a block diagram of a computing device 1002 is shown in which illustrative embodiments may be implemented. The computing device 1002 may be the mobile communication device 102 or 202 described in FIG. 1 or 2, respectively. The computing device 1002 may be the computing device on which the crisis management systems depicted in FIG. 1-FIG. 9 is implemented. Computer-usable program code or instructions implementing the processes used in the illustrative embodiments may be located on the computing device 1002. The computing device 1002 includes a communications fabric 1003, which provides communications between a processor unit 1005, a memory 1007, a persistent storage 1009, a communications unit 1011, an input/output (I/O) unit 1013, and a display 1015.

The processor unit 1005 serves to execute instructions for software that may be loaded into the memory 1007. The processor unit 1005 may be a set of one or more processors or may be a multi-processor core, depending on the particular implementation. Further, the processor unit 1005 may be implemented using one or more heterogeneous processor systems in which a main processor is present with secondary processors on a single chip. As another illustrative example, the processor unit 1005 may be a symmetric multi-processor system containing multiple processors of the same type.

The memory 1007, in these examples, may be, for example, a random access memory or any other suitable volatile or non-volatile storage device. The persistent storage 1009 may take various forms depending on the particular implementation. For example, the persistent storage 1009 may contain one or more components or devices. For example, the persistent storage 1009 may be a hard drive, a flash memory, a rewritable optical disk, a rewritable magnetic tape, or some combination of the above. The media used by the persistent storage 1009 also may be removable. For example, a removable hard drive may be used for the persistent storage 1009.

The communications unit 1011, in these examples, provides for communications with other data processing systems or communication devices. In these examples, the communications unit 1011 may be a network interface card. The communications unit 1011 may provide communications through the use of either or both physical and wireless communication links.

The input/output unit 1013 allows for the input and output of data with other devices that may be connected to the computing device 1002. For example, the input/output unit 1013 may provide a connection for user input through a keyboard and mouse. Further, the input/output unit 1013 may send output to a processing device. In the case in which the computing device 1002 is a cellular phone, the input/output unit 1013 may also allow devices to be connected to the cellular phone, such as microphones, headsets, and controllers. The display 1015 provides a mechanism to display information to a user, such as a graphical user interface. The display 1015 may be used to display the text messages described in the illustrative embodiments.

Instructions for the operating system and applications or programs are located on the persistent storage 1009. These instructions may be loaded into the memory 1007 for execution by the processor unit 1005. The processes of the different embodiments may be performed by the processor unit 1005 using computer-implemented instructions, which may be located in a memory, such as the memory 1007. These instructions are referred to as program code, computer-usable program code, or computer-readable program code that may be read and executed by a processor in the processor unit 1005. The program code in the different embodiments may be embodied on different physical or tangible computer-readable media, such as the memory 1007 or the persistent storage 1009.

Program code 1017 is located in a functional form on a computer-readable media 1019 and may be loaded onto or transferred to the computing device 1002 for execution by the processor unit 1005. The program code 1017 and the computer-readable media 1019 form computer program product 1021 in these examples. In one embodiment, the computer program product 1021 is the crisis management application described in the above figures. In this embodiment, the program code 1017 may include computer-usable program code capable of locating a mobile communication device associated with a user to form location data, accessing a location database to determine a geographic location of the mobile communication device based on the location data, and identifying an aggressor in a crisis situation.

In another embodiment, the program code 1017 may include computer-usable program code capable of receiving an image captured by a camera of a mobile communication device. The mobile communication device is associated with a user, and the image at least partially contains an object. Any combination of the above-mentioned computer-usable program code may be implemented in the program code 1017, and any functions of the illustrative embodiments may be implemented in the program code 1017.

In one example, the computer-readable media 1019 may be in a tangible form, such as, for example, an optical or magnetic disc that is inserted or placed into a drive or other device that is part of the persistent storage 1009 for transfer onto a storage device, such as a hard drive that is part of the persistent storage 1009. In a tangible form, the computer-readable media 1019 also may take the form of a persistent storage, such as a hard drive or a flash memory that is connected to the computing device 1002. The tangible form of the computer-readable media 1019 is also referred to as computer recordable storage media.

Alternatively, the program code 1017 may be transferred to the computing device 1002 from the computer-readable media 1019 through a communication link to the communications unit 1011 or through a connection to the input/output unit 1013. The communication link or the connection may be physical or wireless in the illustrative examples. The computer-readable media 1019 also may take the form of non-tangible media, such as communication links or wireless transmissions containing the program code 1017.

The different components illustrated for the computing device 1002 are not meant to provide architectural limitations to the manner in which different embodiments may be implemented. The different illustrative embodiments may be implemented in a data processing system including components in addition to or in place of those illustrated for computing device 1002. Other components shown in FIG. 10 can be varied from the illustrative examples shown.

As one example, a storage device in the computing device 1002 is any hardware apparatus that may store data. The memory 1007, the persistent storage 1009, and the computer-readable media 1019 are examples of storage devices in a tangible form. In another example, a bus system may be used to implement the communications fabric 1003 and may be comprised of one or more buses, such as a system bus or an input/output bus. Of course, the bus system may be implemented using any suitable type of architecture that provides for a transfer of data between different components or devices attached to the bus system. Additionally, the communications unit 1011 may include one or more devices used to transmit and receive data, such as a modem or a network adapter. Further, a memory may be, for example, the memory 1007 or a cache such as found in an interface and memory controller hub that may be present in the communications fabric 1003.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The previous detailed description is of a small number of embodiments for implementing the invention and is not intended to be limiting in scope. One of skill in this art will immediately envisage the methods and variations used to implement this invention in other areas than those described in detail.

As set forth above, according to various exemplary embodiments of the present invention, since an inductance of the transmission coil may be increased while suppressing a size of the transmission coil on a plane, the wireless power transmission apparatus and the wireless power reception apparatus that may increase an amount of transmitted power and are more compact may be implemented.

In the disclosure and the claims, terms such as "first", "second", "third", "fourth", and the like, if any, will be used to distinguish similar components from each other and be used to describe a specific sequence or a generation sequence, but is not necessarily limited thereto. It will be understood that these terms are compatible with each other under an appropriate environment so that exemplary embodiments of the present invention set forth herein may be operated in a sequence different from a sequence illustrated or described herein. Likewise, in the case in which it is described herein that a method includes a series of steps, a sequence of these steps suggested herein is not necessarily a sequence in which these steps may be executed. That is, any described step may be omitted and/or any other step that is not described herein may be added to the method.

In addition, in the disclosure and the claims, terms such as "left", "right", "front", "rear", "top", "bottom", "over", "under", and the like, if any, do not necessarily indicate relative positions that are not changed, but are used for explanation. It will be understood that these terms are compatible with each other under an appropriate environment so that exemplary embodiments of the present invention set forth herein may be operated in a direction different from a direction illustrated or described herein. A term "connected" used herein is defined as being directly or indirectly connected in an electrical or non-electrical scheme. Here, targets described as being "adjacent to" each other may physically contact each other, be close to each other, or be in the same general range or region, in a context in which the above phrase is used. Here, a phrase "in an exemplary embodiment" means the same exemplary embodiment, but is not necessarily limited thereto.

In addition, in the disclosure and the claims, terms such as "connected", "connecting", "linked", "linking", "coupled", "coupling", and the like, and various modifications of these terms may be used as the meaning including that one component is directly connected to another component or is indirectly connected to another component through the other component.

In addition, terms "module" and "unit" for components used in the present disclosure are used only in order to easily make the disclosure. Therefore, these terms do not have meanings or roles that distinguish from each other in themselves.

In addition, terms used in the present disclosure are for explaining exemplary embodiments rather than limiting the present invention. In the present disclosure, a singular form includes a plural form unless explicitly described to the contrary. Components, steps, operations, and/or elements mentioned by terms "comprise" and/or "comprising" used in the disclosure do not exclude the existence or addition of one or more other components, steps, operations, and/or elements.

Hereinabove, the present invention has been described with reference to exemplary embodiments thereof. All exemplary embodiments and conditional illustrations disclosed in the present disclosure have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, exemplary embodiments disclosed herein should be considered in an illustrative aspect rather than a restrictive aspect. The scope of the present invention should be defined by the claims rather than the above-mentioned description, and equivalents to the claims should be interpreted to fall within the present invention.

While the foregoing is directed to embodiments of the present invention, other and further embodiments of the invention may be devised without departing from the basic scope thereof. For example, although numerous embodiments having various features have been described herein, combinations of such various features in other combinations not discussed herein are contemplated within the scope of embodiments of the present invention.

What is claimed is:

1. A method comprising:
   registering, by a crisis management system, a group of users for access to a crisis management system;
   receiving, by the crisis management system, an indication of a crisis event at a physical location from at least one user of the group of users, the crisis event caused by an aggressor;
   determining, by the crisis management system, a location of the aggressor;
   creating, by the crisis management system, a secure communication channel between the group of users, wherein each user, of the group of users, may communicate with any other user, of the group of users, via the secure communication channel;
   denying access, by the crisis management system, to the secure communication channel to the aggressor;
   notifying, by the crisis management system, the group of users of the location of the aggressor; and
   identifying, by the crisis management system, an escape route for each user, of the group of users, based on a physical capability of each user.

2. The method of claim 1, wherein the determining location of the aggressor is determined by at least one of:
   receiving, by the crisis management system, an indication of the location of the aggressor from at least one user of the group of users; and
   retrieving, by the crisis management system, location data from a device carried by the aggressor.

3. The method of claim 1, further comprising:
   collecting, by the crisis management system, aggressor identity information and identifying the aggressor based on the aggressor identity information; and
   notifying, by the crisis management system, the group of users of the identification of the aggressor.

4. The method of claim 3, wherein the aggressor identity information comprises an identity of the aggressor received from at least one user of the group of users.

5. The method of claim 3, wherein the aggressor identity information comprises at least one of audio collected from the aggressor, video of the aggressor captured at the location of the crisis, and an identification of a device carried by the aggressor.

6. The method of claim 1, wherein the identifying an escape route further comprises:
identifying an escape route based on parameters of the physical location, the parameters comprising at least one of a floorplan, a location of one or more exits, and a location of one or more obstacles to the one or more exits.

7. The method of claim 6, wherein the physical capability comprises at least one of a foot speed of each user and any physical limitations of each user.

8. The method of claim 1, wherein the secure communication channel is established between mobile communications devices.

9. The method of claim 1, further comprising notifying, by the crisis management system, law enforcement of crisis information comprising at least one of a type of crisis, the identity of the aggressor, the location of the aggressor, the locations of each user of the group of users.

10. The method of claim 1, further comprising activating, by the crisis management system, a crisis suppression system comprising at least one of a door lock, an audible alarm, a vision suppression system, a hearing suppression system, and an alert transmission system.

11. An apparatus comprising:
memory storing instructions; and
a processor configured to execute the instructions to cause the processor to:
register a group of users for access to a crisis management system;
receive, by the crisis management system, an indication of a crisis event at a physical location from at least one user of the group of users, the crisis event caused by an aggressor;
determine, by the crisis management system, a location of the aggressor;
create, by the crisis management system, a secure communication channel between the group of users, wherein each user of the group of users may communicate with any other user of the group of users via the secure communication channel;
deny access, by the crisis management system, to the secure communication channel to the aggressor;
notify, by the crisis management system, the group of users of the location of the aggressor; and
identify an escape route for each user, of the group of users, based on a physical capability of each user.

12. The apparatus of claim 11, wherein the processor is further configured to:
collect, by the crisis management system, aggressor identity information and identifying the aggressor based on the aggressor identity information; and
notify, by the crisis management system, the group of users of the identification of the aggressor.

13. The apparatus of claim 12, wherein the aggressor identity information comprises an identity of the aggressor received from at least one user of the group of users.

14. The apparatus of claim 12, wherein the aggressor identity information comprises at least one of audio collected from the aggressor, video of the aggressor captured at the location of the crisis, and an identification of a device carried by the aggressor.

15. The apparatus of claim 11, wherein the secure communication channel is established between mobile communications devices.

16. A non-transitory computer readable storage medium storing instructions that when executed by a processor cause the processor to:
register a group of users for access to a crisis management system;
receive, by the crisis management system, an indication of a crisis event at a physical location from at least one user of the group of users, the crisis event caused by an aggressor;
determine, by the crisis management system, a location of the aggressor;
create, by the crisis management system, a secure communication channel between the group of users, wherein each user of the group of users may communicate with any other user of the group of users via the secure communication channel;
deny access, by the crisis management system, to the secure communication channel to the aggressor;
notify, by the crisis management system, the group of users of the location of the aggressor; and
identify, by the crisis management system, an escape route for each user, of the group of users, based on a physical capability of each user.

17. The non-transitory computer readable storage medium of claim 16, wherein the instructions further cause the processor to:
collect, by the crisis management system, aggressor identity information and identifying the aggressor based on the aggressor identity information; and
notify, by the crisis management system, the group of users of the identification of the aggressor.

18. The non-transitory computer readable storage medium of claim 16, wherein, when the processor is caused to identify an escape route, the processor is further caused:
identify an escape route based on parameters of the physical location, the parameters comprising at least one of a floorplan, a location of one or more exits, and a location of one or more obstacles to the one or more exits.

19. The non-transitory computer readable storage medium of claim 18, the physical capabilities comprise at least one of a foot speed of each user and any physical limitations of each user.

20. The non-transitory computer readable storage medium of claim 16, wherein the secure communication channel is established between mobile communications devices.

* * * * *